(12) United States Patent
Williams

(10) Patent No.: US 6,853,534 B2
(45) Date of Patent: Feb. 8, 2005

(54) TUNABLE CAPACITOR

(75) Inventor: Kirt R. Williams, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/458,131

(22) Filed: Jun. 9, 2003

(65) Prior Publication Data

US 2004/0246653 A1 Dec. 9, 2004

(51) Int. Cl.[7] ................................................ H01G 5/00
(52) U.S. Cl. ...................... 361/277; 361/278; 361/287; 361/298.2
(58) Field of Search ................................. 361/277, 278, 361/281, 283.2, 287, 290, 292, 298.2, 280

(56) References Cited

U.S. PATENT DOCUMENTS 5,159,524 A * 10/1992 Hasegawa et al. .......... 361/271
5,557,495 A * 9/1996 Belcher et al. .......... 361/298.2

OTHER PUBLICATIONS

Jun–Bo Yoon, et al.; "A High–Q Tunable Micromechanical Capacitor with Movable Dielectric for RF Applications"; Technical Digest, IEEE Int. Electron Devices Meeting; pp. 489–492.

Nathan Bushyager, et al.; "A Novel Adaptive Approach to Modeling Mems Tunable Capacitors Using MRTD and FDTD Techniques".

Darrin Young, et al.; "A Monolithic Micromachined RF Low–Noise VCO"; http://buffy.eecs.berkeley.edu/iro/summary/97abstacts/dyoung.1.html; pp. 1–3.

Aleksander Dec, et al.; "Micromachined Electro–Mechanically Tunable Capacitors and Their Applications to RF IC'S"; IEEE Transactions on Microwave Theory and Techniques, vol. 46, No. 12, Dec. 1998; pp. 2587–2596.

* cited by examiner

Primary Examiner—Anthony Dinkins

(57) ABSTRACT

A tunable capacitor. The tunable capacitor has a first fixed capacitor electrode and a second fixed capacitor electrode opposite to one another. The tunable capacitor also has a movable element formed of a conductive material. The movable element is moveable between the first fixed capacitor electrode and the second fixed capacitor electrode to adjust the capacitance between the first fixed capacitor electrode and the second fixed capacitor electrode.

17 Claims, 6 Drawing Sheets

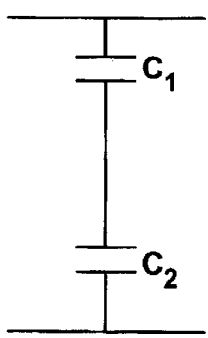 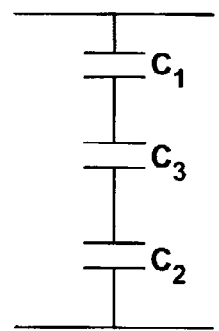
FIG. 4A     FIG. 4B

TUNABLE CAPACITOR

TECHNICAL FIELD

Embodiments in accordance with the present invention relate to the field of tunable capacitors. Specifically, embodiments in accordance with the present invention relate to a tunable capacitor having a high Q.

BACKGROUND ART

Many applications incorporate a tunable integrated circuit capacitor. Micromachined electro-mechanical devices (MEMs) provide a way to construct a tunable capacitor within an integrated circuit. An important parameter for a capacitor is the quality factor (Q). To achieve a high Q, a capacitor should have a low parasitic series resistance, as given by the equation $Q=1/(2\pi fRC)$, where R is the parasitic series resistance. A high-Q capacitor is desirable in many applications. For example, low-noise radio frequency (RF) voltage controlled oscillators (VCOs) need a resonant device with a high Q because the phase noise of an oscillator is proportional to $1/Q^2$, where Q is the overall Q of the resonator (W. P. Robins, "Phase Noise in Signal Sources: Theory and Applications." Stevenage, U.K: Peregrinus, 1982, pp. 49–53). Also, high dynamic range filters need a high-Q resonator because the dynamic range of the filter is proportional to $Q^2$ (S. Pipilos et al., "A Si 1.8 GHz RLC Filter with Tunable Center Frequency and Quality Factor," IEEE J. Solid-State Circuits, vol. 31, pp. 1517–1525, October 1996).

FIG. 1 illustrates a conventional MEM tunable interdigitated capacitor 100. The fixed fingers 110 attached to the fixed block 115 serve as a first electrode of the tunable interdigitated capacitor 100. The movable fingers 120 attached to the movable block 125 serve as a second electrode of the tunable interdigitated capacitor 100. The movable fingers 120 do not move relative to the movable block 125, but rather move with it. The movable block 125 is attached to a system of springs 130, which are typically hundreds of micrometers ($\mu$m) long but only about a few $\mu$m wide.

A control voltage is used to increase the overlap between the movable fingers 120 and the fixed fingers 110. One terminal of the control voltage is electrically coupled to the fixed block 115. The other terminal of the control voltage is fed into the movable block 125 via one or more of the springs 130 attached to the movable block 125. Increasing the magnitude of the control voltage causes the movable fingers 120 to move between the fixed fingers 110, as shown by the arrows 135 in FIG. 1. The electrostatic force resulting from the control voltage works against the force from the system of springs 130. Varying the magnitude of the control voltage alters the overlap between the fixed fingers 110 and movable fingers 120, and hence varies the capacitance. In this fashion, a tunable interdigitated capacitor is achieved using MEM technology. The tunable interdigitated capacitor 100 has a substantial range in capacitance because the area of overlap between the fixed fingers 110 and movable fingers 120 has a large range.

The capacitance is a function of the overlap between the fixed fingers 110 and the movable fingers 120. The fixed fingers 110 are coupled to one terminal of the capacitance voltage through the fixed block 115. The movable electrodes 120 are coupled to the other terminal of the capacitance voltage thorough the movable block 125 via one or more of the springs 130. Significantly, the springs 130 must be narrow to provide a suitable spring coefficient. A typical width is a three $\mu$m. Moreover, the springs 130 must be relatively long. A typical length is hundreds of $\mu$m. Therefore, the springs 130 through which current flows to the capacitor have a relatively high resistance. Typically, the resistance is on the order of one ohm, which is relatively high for this type of circuit and considerably degrades the Q.

Thus, one problem with conventional MEM tunable interdigitated capacitors is that such capacitors have a relatively high parasitic resistance that lowers the Q.

DISCLOSURE OF THE INVENTION

The present invention pertains to a tunable capacitor. An embodiment in accordance with the invention is a tunable capacitor having a first fixed capacitor electrode and a second fixed capacitor electrode opposite the first fixed capacitor electrode. The tunable capacitor also has a movable element comprising a conductive material. The movable element is moveable between the first fixed capacitor electrode and the second fixed capacitor electrode to adjust the capacitance between the first fixed capacitor electrode and the second fixed capacitor electrode.

Another embodiment of the invention is a tunable capacitor comprising a first fixed capacitor electrode and a second fixed capacitor electrode opposite the first fixed capacitor electrode. The tunable capacitor also has a movable element that is moveable between the first fixed capacitor electrode and the second fixed capacitor electrode to adjust the capacitance between the first fixed capacitor electrode and the second fixed capacitor electrode. The tunable capacitor also comprises a means that moves the movable element in response to a control voltage that is not applied between the first fixed capacitor electrode and the second fixed capacitor electrode.

Embodiments in accordance with the invention provide a tunable capacitor with a high Q.

BRIEF DESCRIPTION OF THE DRAWINGS

The accompanying drawings, which are incorporated in and form a part of this specification, illustrate embodiments according to the invention and, together with the description, serve to explain the principles of the invention:

FIGS. 4A and 4B are diagrams of models for the capacitance achieved in accordance with embodiments of the invention.

DETAILED DESCRIPTION OF THE INVENTION

Figure 2A:
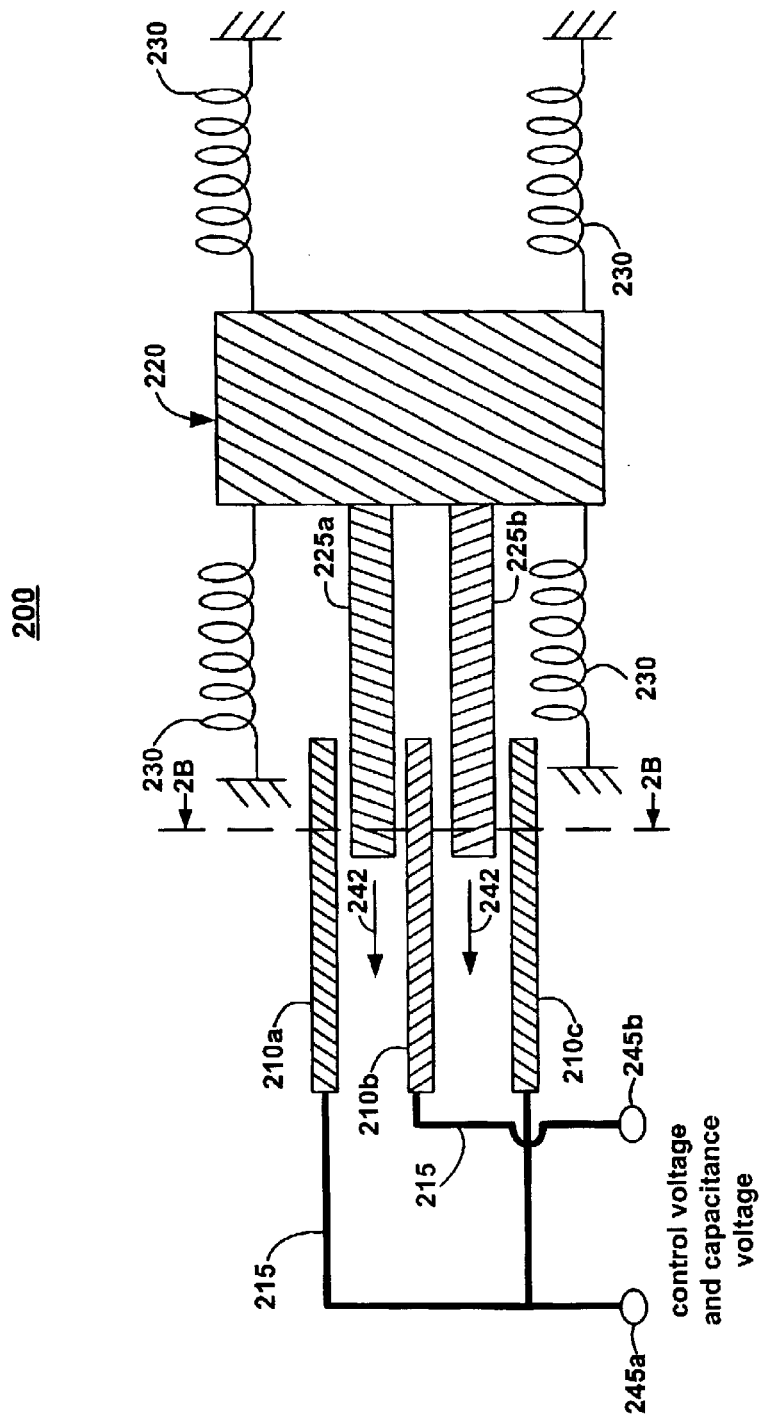
FIG. 2A is top view of a tunable capacitor in accordance with a first embodiment of the invention.
Figure 2B:
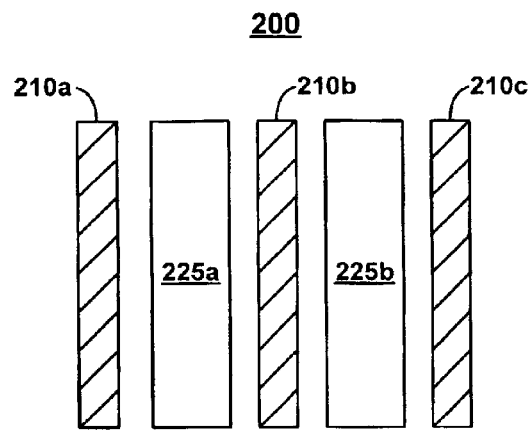
FIG. 2B is cross-sectional view of the tunable capacitor along the line 2B—2B in FIG. 2A.

FIG. 2A illustrates an exemplary embodiment of a tunable interdigitated capacitor 200 in accordance with an embodiment of the present invention. The exemplary tunable interdigitated capacitor 200 has fixed fingers 210a–c, which serve as the electrodes of the tunable interdigitated capacitor 200. The exemplary tunable interdigitated capacitor 200 also has movable components 225a–b that are used to adjust the capacitance between fixed finger 210b and fixed fingers 210a and 210c. FIG. 2B is cross-sectional view of the tunable interdigitated capacitor 200 along the line 2B—2B in FIG. 2A.

Referring again to FIG. 2A, fixed fingers 210a and 210c, which constitute one electrode of tunable capacitor 200, are electrically connected to one terminal 245a. In a similar fashion, the other fixed finger 210b, which constitutes the other electrode of tunable capacitor 200, is electrically connected to the other terminal 245b. A combination of the control voltage and capacitance voltage is applied to the tunable capacitor 200 via terminals 245a–b.

Figure 2C:
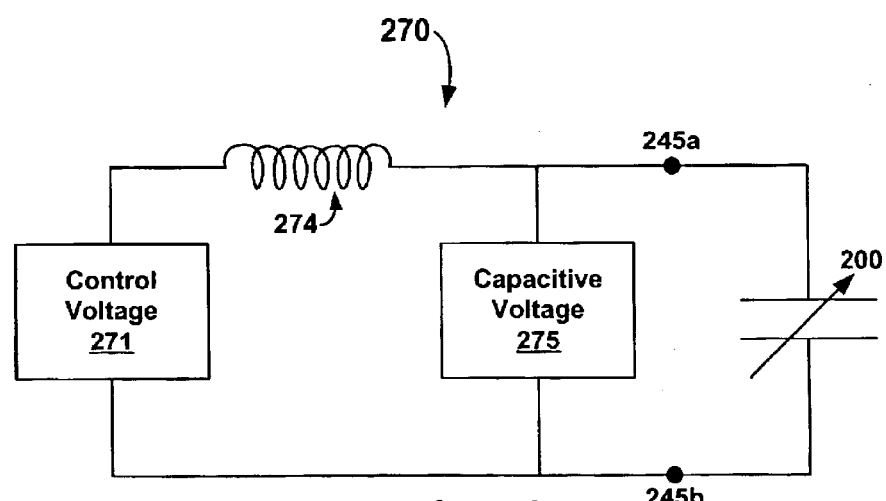
FIG. 2C is a circuit illustrating how the control voltage and capacitance voltage are connected to a variable capacitor according to an embodiment of the present invention.

FIG. 2C is a circuit diagram 270 illustrating an exemplary connection of a control voltage source 271 and a capacitance voltage source 275 to variable capacitor 200, according to an embodiment of the present invention. In FIG. 2C, one terminal of the control voltage source 271 is connected to a terminal 245b of the variable capacitor 200. The other terminal of the control voltage source 271 is connected to the other terminal 245a of the variable capacitor 200 via an inductor 274. One terminal of the capacitance voltage source 275, for example a circuit of which tunable capacitor 200 forms a part, is connected to terminal 245b of the tunable capacitor 200. The other terminal of the capacitive voltage source 275 is coupled to terminal 245a of the tunable capacitor 200. In this embodiment, the control voltage source 271 is a DC voltage and the inductor 274 serves as a low pass filter that isolates the capacitive voltage source 275 and the variable capacitor 200 from the control voltage source 271 at the operating frequency. However, the present invention is not limited to using a DC control voltage. In another embodiment, the control voltage is an AC voltage. The AC control voltage has a frequency above the frequency at which the movable capacitor electrode and its associated springs has significant mechanical response. A circuit different from the circuit 270 in FIG. 2C is employed when using an AC control voltage. If desired, the same voltage source can be used for both the control voltage and the capacitance voltage.

Figure 1:
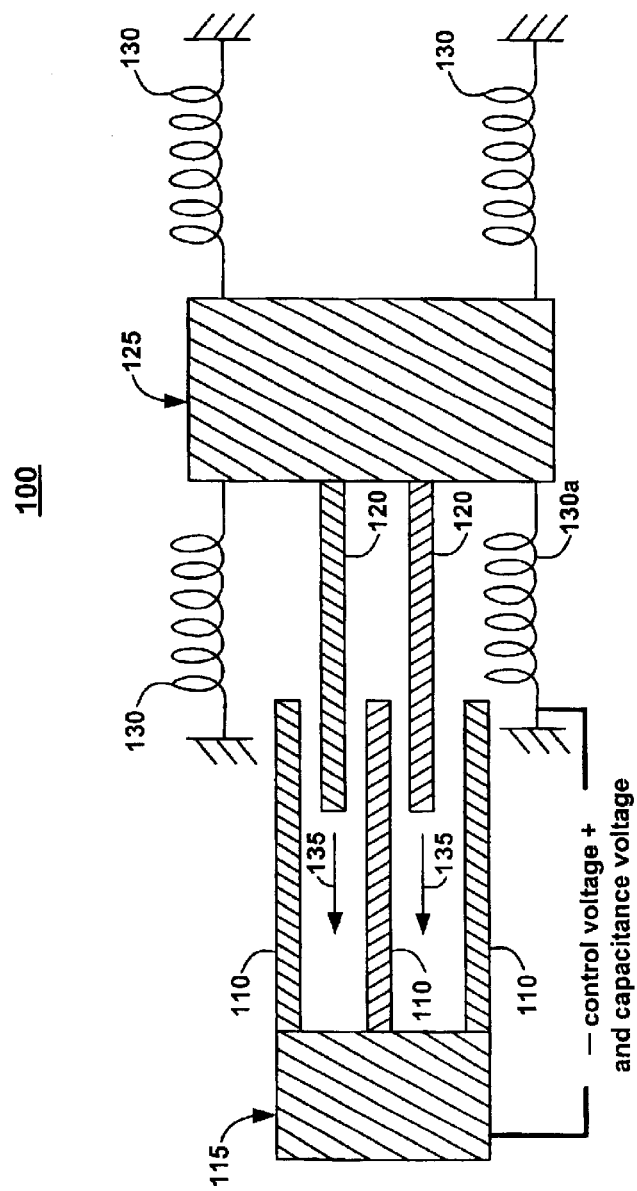
FIG. 1 is a top view of a conventional MEM tunable interdigitated capacitor.

FIG. 2A shows only three fixed fingers 210a–c to simplify the drawing. In other embodiments, the tunable capacitor 200 is composed of many more fixed fingers 210. Because the fixed fingers 210a–c that serve as the capacitor electrodes are fixed, the conductors 215 that feed the capacitance voltage to the capacitor electrodes do not additionally serve as springs and can be made relatively thick to provide a low series resistance. "Low" series resistance is lower than the series resistance of the springs of a typical conventional capacitor, such as the springs of the capacitors shown in FIG. 1. The low series resistance of the conductors 215 provides a high-Q capacitor. A "high"-Q is higher than the Q of a conventional capacitor such as the capacitors shown in FIG. 1. In contrast to the conventional interdigitated capacitors in FIG. 1, neither of the terminals 245a–b is connected to the fixed fingers 210 through a spring. Thus, the embodiment in FIG. 2A has substantially less parasitic resistance than a conventional tunable interdigitated capacitor. Thus, the tunable interdigitated capacitor 200 of FIG. 2A has a high Q.

Still referring to FIG. 2A, the exemplary tunable capacitor 200 has a movable element comprising a movable block 220 from which movable components 225a–b extend between the fixed fingers 210a–c. The movable block 220 is attached to a system of springs 230. A control voltage is applied between the fixed finger 210b and fixed fingers 210a and 210c via terminals 245a–b. Increasing the magnitude of the control voltage draws the movable components 225a–b towards the fixed fingers 210a–c and increases the overlap between the movable components 225a–b and the fixed fingers 210a–c, as shown by the arrows 242 in FIG. 2A. In another embodiment, the movable element comprises only a single component 225 and does not comprise a movable block 220.

The tunable capacitor has a gap between the fixed fingers 210. The gap is filled with a gas, for example, air in one embodiment. In another embodiment, the gap is evacuated. The movable components 225a–b occupy a part of the gap when the movable components 225a–b overlap the fixed fingers 210. In some embodiments, the movable components 225a–b are conductive, at least at their surfaces. In other embodiments, the movable components 225 are formed of a dielectric material. However, a movable component 225a–b with at least one conductive surface will provide a greater change in capacitance for the same change in overlap between the movable component 225a–b and the fixed fingers 210a–c than would a movable component 225a–b formed of a dielectric material.

In embodiments in which the movable components 225 are formed at least in part of a conductive material, the region in which a movable component 225 overlaps two adjacent fixed fingers 210 can be described as two capacitors in series, each with a small gap between the movable component 225 and the adjacent fixed finger 210. The increase in capacitance in the region of overlap can be understood by modeling adjacent fixed electrodes and the region therebetween as capacitors in series. The modeling can be applied to both the case in which the movable component 225 overlaps adjacent fixed fingers 210 and the case in which there is no overlap between the movable component 225 and the adjacent fixed fingers 210. FIG. 4A illustrates a model for the overlapping case and comprises two capacitors in series. The model for the first capacitor ($C_1$) has the thickness and dielectric constant of the gap between the movable component 225 and one fixed electrode, and the model for the second capacitor ($C_2$) has the thickness and dielectric constant of the gap between the movable component 225 and other fixed electrode. The movable component 225 can be modeled as a short circuit between the two model capacitors. FIG. 4B illustrates a model for the case in which the movable component 225 does not overlap the fixed fingers 210 and comprises three capacitors in series. Two of the model capacitors ($C_1$ and $C_2$) in the non-overlapping case are the same as the two model capacitors in the overlapping case. The third model capacitor ($C_3$) in the non-overlapping case has the thickness of the movable component 225 and the dielectric constant of the gap between the fixed fingers 210. The non-overlapping case will have a lower capacitance than the overlapping case because of the third model capacitor ($C_3$) in series with the other two model capacitors. For purposes of the present application, the term "conductive" means a material that causes the tunable capacitor to function as two capacitors in series when a movable component 225 overlaps two adjacent fixed fingers 210.

In some embodiments the movable components 225 are formed of a dielectric material. In these embodiments, the capacitance increases as the movable components 225 move farther into the fixed fingers 210 because the dielectric constant between the fixed electrodes is increased. That is, the dielectric constant of the moveable component is greater than the dielectric constant of the gas or vacuum gap between the fixed fingers 210. Both the case in which a moveable component overlaps adjacent fixed fingers 210 and the case in which there is no such overlap can be modeled as three capacitors in series as illustrated in FIG. 4B. Two of the model capacitors ($C_1$ and $C_2$) are modeled the same in each case. The third model capacitor ($C_3$) in the overlapping case has a thickness and dielectric constant of the moveable component. The third model capacitor ($C_3$) in the non-overlapping case has the thickness of the moveable component and the dielectric constant of the gap between the fixed fingers 210. If the dielectric constant of the moveable component is greater than the dielectric constant of the gap between the fixed fingers 210, the capacitance of the tunable capacitor increases as the overlap between the movable components 225 and the fixed fingers 210 increases.

However, a movable component 225 with a conductive surface will typically provide a greater capacitive change for the same displacement into the region between the fixed fingers 210 than a movable component 225 formed of a dielectric material. The higher capacitive change can be understood by referring to the models for the capacitance between the fixed electrodes. Two capacitors in series connected by a short circuit will have a greater capacitance than the same two capacitors connected in series with a third capacitor, provided the third capacitor has a finite capacitance.

Figure 3A:
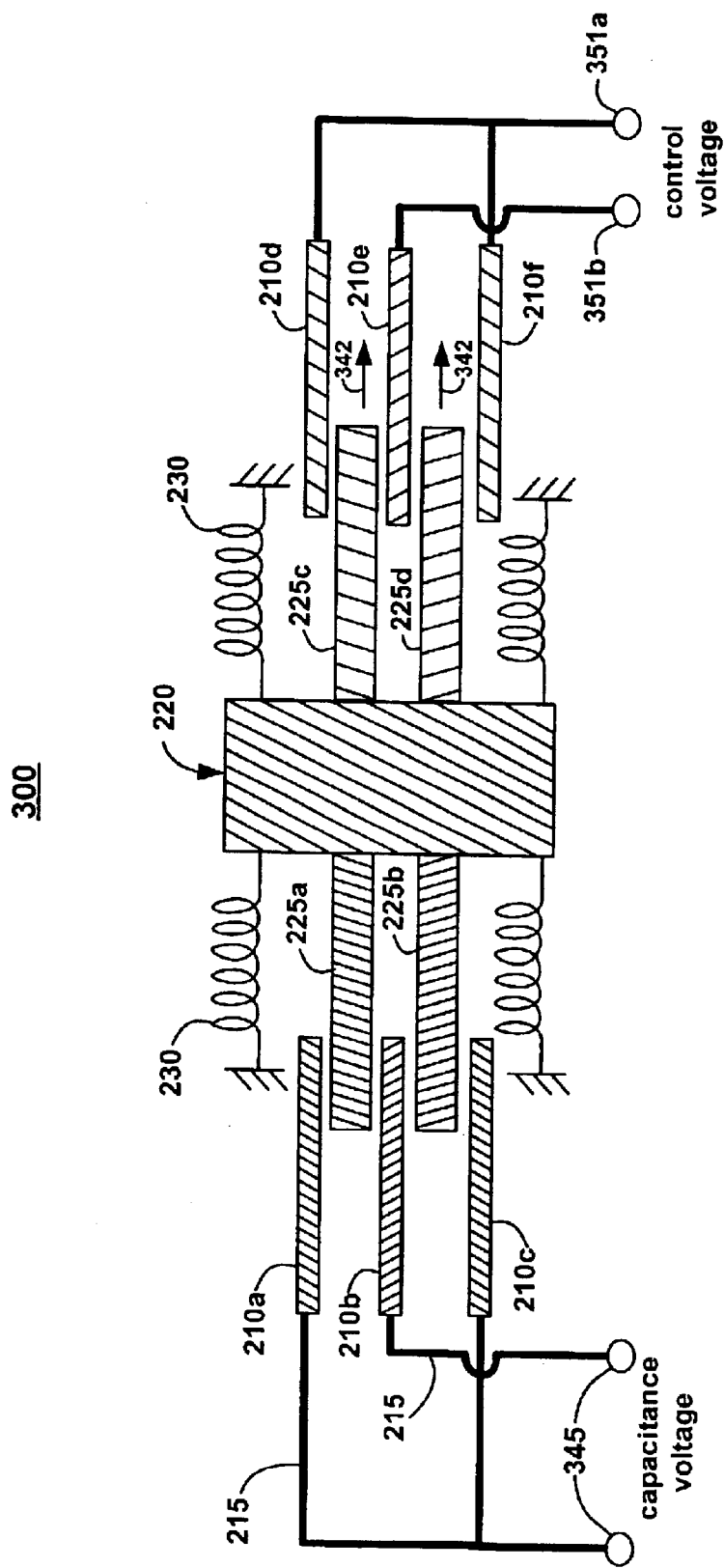
FIG. 3A is a tunable capacitor in accordance with a second embodiment of the invention.

FIG. 3A is an illustration of another exemplary embodiment of a tunable interdigitated capacitor 300, according to an embodiment of the invention in which the terminals 351 that connect to the control voltage are independent of the terminals 345 that connect to the capacitance voltage. In this embodiment, movable components 225a–b extend from a first side of the movable block 220 and movable components 225c–d extend from a second side of the movable block 220 opposite the first side. One control voltage terminal 351a is connected to fixed components 210d and 210f, and the other control voltage terminal 351b is connected to fixed component 210e. The control voltage is thus applied between fixed fingers 210e and fixed fingers 210d and 210f. The movable components 225c–d are drawn toward the fixed fingers 210d–f as the magnitude of the control voltage is increased, as shown by the arrows 342 in FIG. 3A. This causes movable block 220 to move and to decrease the overlap between movable components 225a–b and fixed fingers 210a–c. The capacitance voltage terminals 345 are not connected to the fixed fingers 210a–c through any of the springs 230. Rather, the capacitance voltage terminals 345 are connected to the fixed fingers 210a–c through conductors 215, which have a very low resistance. Thus, the embodiment of FIG. 3A has a higher Q than the conventional interdigitated capacitors in FIG. 1.

Figure 3B:
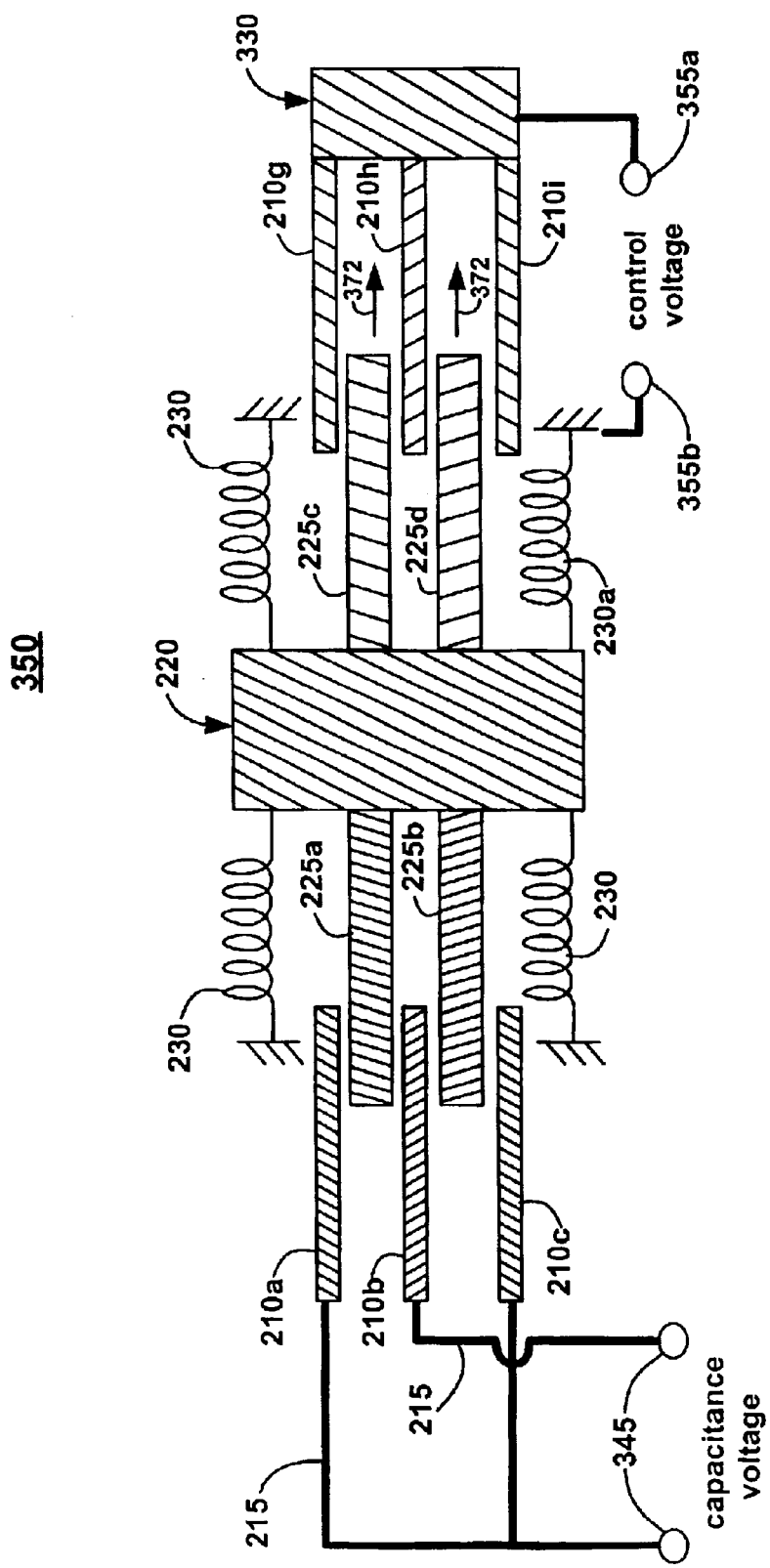
FIG. 3B is a tunable capacitor in accordance with a third embodiment of the invention.

FIG. 3B is an illustration of another exemplary embodiment of a tunable interdigitated capacitor 350, according to another embodiment of the invention in which the control voltage terminals 355a–b are independent of the capacitance voltage terminals 345. This embodiment has a fixed block 330 having fixed fingers 210g–i. One control voltage terminal 355a is connected to the fixed block 330. The other control voltage terminal 355b is connected to the spring 230a attached to the movable block 220. Application of a control voltage to the control voltage terminals 355a–b causes the movable components 225c–d to move in the direction of arrows 372 toward the fixed block 330. Although one control voltage terminal 356 is connected to a spring 230, the electrical connection between the capacitance voltage terminals 345 and the fixed fingers 210a–c does not pass through any of the springs 230. Rather, the electrical connections between the capacitance voltage terminals 345 and the fixed fingers 210 are through conductors 215 that have a very low resistance. Thus, the embodiment of FIG. 3B has a higher Q than the conventional MEM tunable interdigitated capacitors in FIG. 1.

While FIGS. 2A, 2B, 3A, and 3B illustrate exemplary tunable capacitors that are interdigitated, the present invention is not limited to an interdigitated configuration. In some embodiments, the tunable capacitor is a parallel-plate capacitor. For example, each capacitor electrode comprises a single plate that oppose one another.

In some embodiments, the movable components 225a–b are conductive, at least at their surfaces. In one such embodiment, the movable components 225a–b are formed entirely of metal. In another embodiment, the movable components 225a–b have a metal coating. In another embodiment, the movable components 225a–b comprise doped silicon. The present invention is not limited to a conductive movable component 225a–b composed of these recited materials. In yet another embodiment, the conductive movable components are silicon coated with metal.

In other embodiments, the movable components 225a–b are formed of a dielectric material. In one such embodiment, the movable components 225a–b comprise silicon. In another embodiment, the movable components 225a–b comprise quartz. However, the present invention is not limited to quartz or silicon as dielectrics to form the movable components 225a–b.

A variety of materials can also be used to fabricate the fixed fingers 210a–c illustrated in FIGS. 2A, 2B, 3A, and 3B. In one embodiment, the fixed fingers 210a–c are formed entirely of metal. In another embodiment, the fixed fingers 210a–c have a metal coating. In still another embodiment, the fixed fingers 210a–c comprise doped silicon. The present invention is not limited to these recited materials to achieve conductive fixed fingers 210a–c. In some embodiments, the tunable capacitor is fabricated in a quartz substrate and the fixed fingers 210-c are formed from metal. In an alternative embodiment, the quartz substrate material is coated with metal to form the fixed fingers 210a–c. Thus, a variety of materials and techniques can be used to fabricate the fixed fingers 210a–c.

The embodiments of exemplary tunable interdigitated capacitors shown in FIGS. 2A, 2B, 3A, and 3B are fabricated by a bulk micromachining process in embodiments of the invention. However, the present invention is not limited to bulk micromachining. In other embodiments of the invention, the tunable interdigitated capacitor is fabricated on a substrate by surface micromachining. The substrate is silicon in some embodiments. However, the substrate material is not limited to silicon. Further, fabrication of the tunable interdigitated capacitor is not limited to micromachining.

While the present invention has been described in particular embodiments, it should be appreciated that the present invention should not be construed as limited by such embodiments, but rather construed according to the below claims.

What is claimed is:

1. A tunable capacitor comprising:
   a first fixed capacitor electrode;
   a second fixed capacitor electrode opposite said first fixed capacitor electrode, wherein said first fixed capacitor electrode and said second fixed capacitor electrode comprise doped semiconductor; and a movable element comprising a conductive material and operable to move between said first fixed capacitor electrode and said second fixed capacitor electrode to adjust the capacitance between said first fixed capacitor electrode and said second fixed capacitor electrode.

2. The tunable capacitor of claim 1, wherein said movable element comprises metal.

3. The tunable capacitor of claim 1, wherein said movable element comprises doped semiconductor.

4. A tunable capacitor comprising
   a first fixed capacitor electrode comprising opposed major surfaces;
   a second fixed capacitor electrode opposite said first fixed capacitor electrode and comprising major surfaces opposite respective ones of said major surfaces of said first fixed capacitor electrode; and
   a movable element comprising a plurality of components comprising a conductive material wherein said components are operable to move between ones of said major surfaces of said first fixed capacitor electrode and ones of said major surfaces of said second fixed capacitor electrode to adjust the capacitance between said first fixed capacitor electrode and said second fixed capacitor electrode.

5. The tunable capacitor of claim 4, wherein said first fixed capacitor electrode and said second fixed capacitor electrode comprise metal.

6. The tunable capacitor of claim 4, wherein said movable element comprises metal.

7. The tunable capacitor of claim 4, wherein said movable element comprises doped semiconductor.

8. A tunable capacitor comprising:
   a first fixed capacitor electrode;
   a second fixed capacitor electrode opposite said first fixed capacitor electrode;
   a movable element moveable between said first fixed capacitor electrode and said second fixed capacitor electrode to adjust the capacitance between said first fixed capacitor electrode and said second fixed capacitor electrode; and
   means for moving said movable element in response to a control voltage that is not applied between said first fixed capacitor electrode and said second fixed capacitor electrode.

9. The tunable capacitor of claim 8, wherein said movable element comprises dielectric material.

10. The tunable capacitor of claim 8, wherein said movable element comprises conductive material.

11. The tunable capacitor of claim 8, wherein said movable element comprises metal.

12. The tunable capacitor of claim 8, wherein said movable element comprises doped semiconductor.

13. The tunable capacitor of claim 8, wherein:
    said first fixed capacitor electrode comprises opposed major surfaces;
    said second fixed capacitor electrode comprises major surfaces opposite respective ones of said major surfaces of said first fixed capacitor electrode; and
    said movable element comprises a plurality of components that are operable to move between ones of said major surfaces of said first fixed capacitor electrode and ones of said major surfaces of said second fixed capacitor electrode to adjust the capacitance between said first fixed capacitor electrode and said second fixed capacitor electrode.

14. A tunable capacitor, comprising:
    a first fixed capacitor electrode;
    a second fixed capacitor electrode opposite said first fixed capacitor electrode;
    a movable element comprising a conductive material and moveable between said first fixed capacitor electrode and said second fixed capacitor electrode to adjust the capacitance between said first fixed capacitor electrode and said second fixed capacitor electrode; and
    means for moving said movable element in response to a control voltage that is not applied between said first fixed capacitor electrode and said second fixed capacitor electrode.

15. The tunable capacitor of claim 14, said movable element comprises metal.

16. The tunable capacitor of claim 14, said movable element comprises doped semiconductor.

17. The tunable capacitor of claim 14, wherein:
    said first fixed capacitor electrode comprises opposed major surfaces;
    said second fixed capacitor electrode comprises major surfaces opposite ones of said major surfaces of said first fixed capacitor electrode; and said movable element comprises a plurality of components that are operable to move between ones of said major surfaces of said first fixed capacitor electrode and ones of said major surfaces of said second fixed capacitor electrode to adjust the capacitance between said first fixed capacitor electrode and said second fixed capacitor electrode.

* * * * *